United States Patent [19]
Berginski et al.

[11] 4,414,442
[45] Nov. 8, 1983

[54] STEERING COLUMN SWITCH

[75] Inventors: Werner-Ernst Berginski, Werdohl-Eveking; Wilhelm Wessling, Luedenscheid, both of Fed. Rep. of Germany

[73] Assignee: Leopold Kostal GmbH & Co. KG, Luedenscheid, Fed. Rep. of Germany

[21] Appl. No.: 365,238

[22] Filed: Apr. 5, 1982

[30] Foreign Application Priority Data

May 8, 1981 [DE] Fed. Rep. of Germany ....... 3118214

[51] Int. Cl.³ .............................................. H01H 3/16
[52] U.S. Cl. ............................... 200/61.27; 200/61.54
[58] Field of Search ............ 200/4, 6 R, 61.27–61.35, 200/61.54

[56] References Cited

U.S. PATENT DOCUMENTS

| | | | |
|---|---|---|---|
| 3,604,975 | 9/1971 | Suzuki et al. | 200/61.27 X |
| 3,718,784 | 2/1973 | Wilkinson | 200/61.27 |
| 3,829,638 | 8/1974 | Suzuki | 200/61.27 |
| 4,142,076 | 2/1979 | Bird | 200/61.27 |

FOREIGN PATENT DOCUMENTS

| | | | |
|---|---|---|---|
| 2828592 | 1/1980 | Fed. Rep. of Germany | |
| 1432008 | 12/1966 | France | 200/61.27 |
| 448142 | 5/1949 | Italy | 200/61.27 |

*Primary Examiner*—J. R. Scott
*Attorney, Agent, or Firm*—Robert E. Knechtel

[57] ABSTRACT

A steering column switch with a rotary pin aligned and parallel to the steering spindle and maintained between socket plates with a switching lever having an annular slider therein encompassing the steering spindle. A rotary pin is retained within a passage in the annular slider. The annular slider is rotatable around the rotary pin and can also be tilted relative to the axis of the rotary pin. The annular slider has a stop profile diametrically opposite the passage for the rotary pin into which a stop spring is engaged. There are contact plates on the rotary pin adjacent the areas where it engages the socket plates. A saddle-shaped contact bridge causes completion of an electrical circuit depending upon the direction of tilting the annular slider.

5 Claims, 6 Drawing Figures

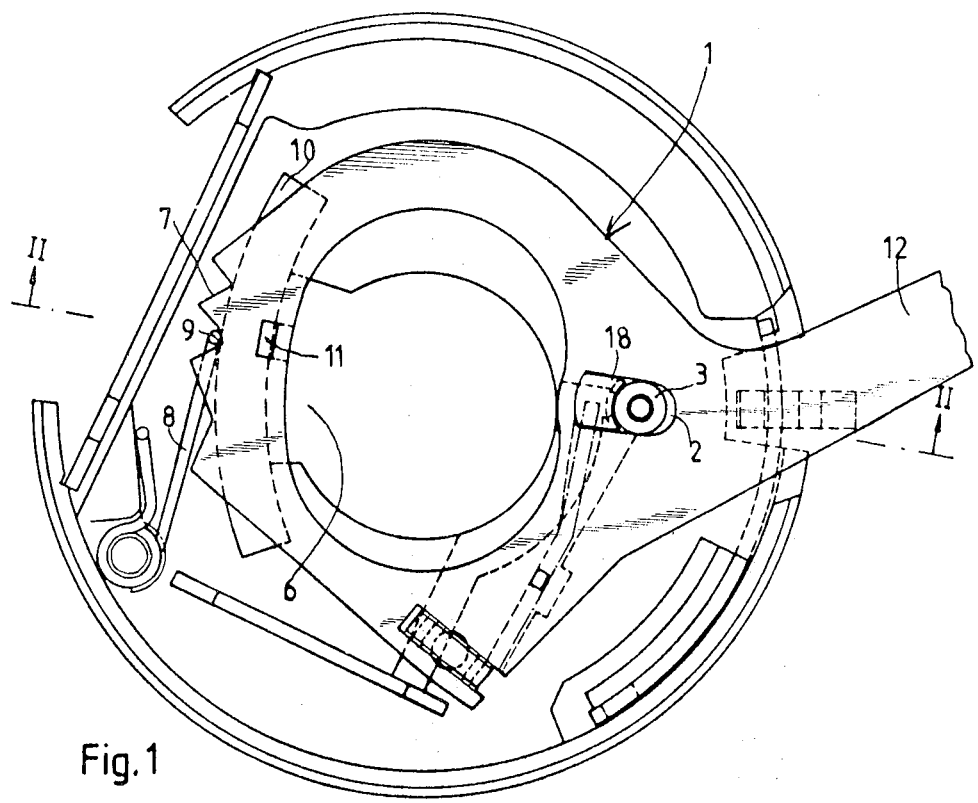
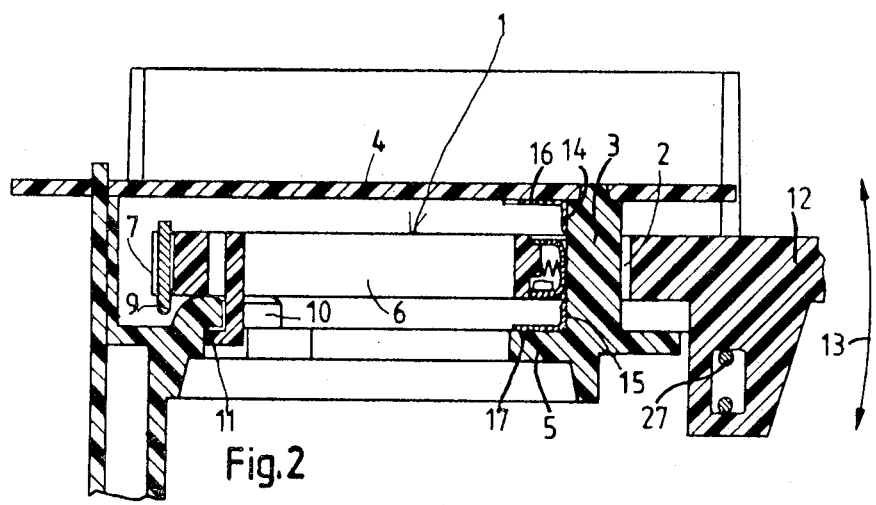

4,414,442

STEERING COLUMN SWITCH

BACKGROUND OF THE INVENTION

This invention relates to electrical switches and more particularly to an electrical switch applicable for use on automotive steering columns.

The automobile today is a complex machine having numerous electrically controlled devices. The operator of the vehicle must be able to control these devices from his seated position without having to awkwardly reach for the many control switches or levers. Thus, it has become increasingly useful to provide electrical switches and controls on the steering column.

One type of steering column switch is illustrated in German Pat. No. 28 28 592. In this Patent there is disclosed a steering column switch having a rotary pin aligned parallel to the steering spindle. The rotary pin is held between socket plates and has an annular ring slider encompassing the steering spindle. A switching lever extends perpendicular from the steering spindle which carries and operates the ring slider. There is a passageway through the annular ring slider through which the rotary pin extends. The switching lever and annular ring slider can be tilted around a tilting axis that is perpendicular to and crosses the axis of the rotary pin. The ring slider is shifted on the rotary pin in the pin's axial direction to control the electrical switching. The ring slider has a stop profile diametrically opposite the steering column from the axial pin. The stop profile is provided with a stop spring which exerts a force against the ring slider.

The ring slider control of this type is used mainly for controlling wiper functions in the automobile. The tilting movement of the ring slider causes it to assume two tilting positions. In one position the washing of the windshield could occur and in a second position, the rear windshield washers or other second function, can occur.

The problem with the switch illustrated in German Pat. No. 28 28 592 is that the contact devices in this Patent are of the lift-off contact type. In such a design the contacts make and break by having the contact areas substantially parallel to each other, and when the contacts are moved adjacent each other, the contact areas touch and complete a circuit. To break the circuit, the contact areas are separated. This type of contact device is not a preferred contact design in that arcing occurs in the contact area, the contacts can become tarnished or have an oxide build-up, and they are not self-cleaning. A preferred type of device is the sliding contact which has the contact areas slide over each other when making or breaking contact. This provides a self-wiping or cleaning action in the contact area. However, on the ring slider as illustrated in the German Patent it is very difficult to provide sliding contact devices which operate from a tilting movement without providing for specially designed mechanical linkages and sliders to achieve this type of switching. This would unduly complicate the design and increase the cost of the switch. Due to the very limited space which is available on a steering column switch, even in the peripheral direction, extra mechanically linked pieces are extremely undesirable. Most of these types are practically unusable in that they would take up too much room on the steering column.

SUMMARY OF THE INVENTION

Thus, it is an object of this invention to provide a steering column switch that would be able to provide the tilting movement required of the switch and still provide contact devices which will work with a sliding motion. It is a related object to provide a sliding contact steering column switch which will provide a secure, safe contact on the ring slider when the switching lever is pivoted to operate the switch.

Yet another object is to provide a steering column contact switch which does not take up any more room on the steering column than previously used switches, and is simple to use and inexpensive to manufacture.

Applicant's solution to the problems of the past prior art devices is to provide a switch which has sliding contacts while still maintaining the compact, inexpensive design of the prior switches. This is accomplished by utilizing a rotary pin aligned parallel to the steering column and spindle. The rotary pin is fixedly maintained between two socket plates. A switching lever encompasses the steering spindle by means of an annular slider having a central opening. The annular slider also has a passage to receive and retain the rotary pin within. The annular slider is rotatable around the pin and can also be tilted relative to the long axis of the pin. Thus, the annular slider can shift along the pin in its axial direction.

There is a stop profile at the end of the annular slider diametrically opposite the passage for the rotary pin on the opposite side of the steering spindle. A spring engages the stop profile to provide pressure to the annular slider. Contact plates are located on the rotary pin adjacent the socket plates. A saddle-shaped contact bridge is retained within the annular slider and when the slider is rocked or tilted, the contact bridge causes completion of an electrical circuit depending on the direction in which the slider is tilted. The contact bridge is designed to provide a wiping, sliding contact area, and the area of contact remains free from dirt and material which could interfere with contact closure.

BRIEF DESCRIPTION OF THE DRAWINGS

Other objects and advantages of the invention will become apparent upon reading the following detailed description and reference to the drawings, in which:

FIG. 1 is a top view of a steering column switch with an upper plate of the housing removed.

FIG. 2 is a cross-sectional view with portions removed taken along sectional line II—II of FIG. 1.

DETAILED DESCRIPTION OF THE DRAWINGS

Figure 3:
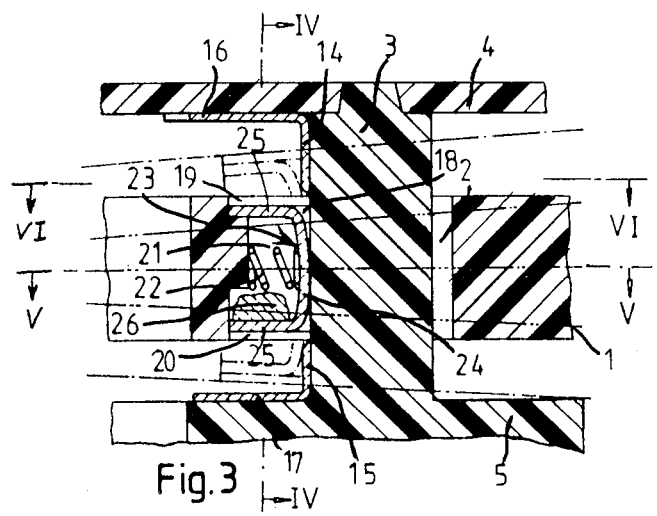
FIG. 3 is an enlarged section of the contact device in the area of the rotary pin.

Turning first to FIG. 1 there is illustrated a top view of a steering column switch which is used to control various wiper functions. A ring slider 1 overlaps a rotary pin 3 by receiving the rotary pin 3 within a passage 2. The rotary pin 3 is held between socket plates 4 and 5 of the housing. The socket plates 4 and/or 5 can have electrical conductor circuits superimposed over their faces. The ring slider 1 has a central breach or opening 6 that encompasses the steering spindle (not represented). Approximately diametrically opposite the rotary pin 3, on the other side of the steering spindle, there is provided a stop profile 7 that fixes the stop position of the ring slider 1. A stop spring 8 meshes and engages the stop profile 7 by means of a stop leg or end 9 supplying a pressure force in a radial direction towards the rotary pin 3. The purpose of the spring force will be described later.

The ring slider 1 slides on a segment profile 10 of the socket plate 5. A projection 11 reaches underneath the segment profile 10 to maintain the slider 1 in its location relative to the socket plate 5 at the stop profile end. Thus, as seen in FIG. 2 a rolling or articulating link is obtained whereby the ring slider 1 can be rocked or rotated by means of a switching lever 12 being moved in the direction of the double arrow 13.

On the rotary pin 3, in the area adjacent the socket plates 4 and 5, are contact plates 14 and 15 which are aligned opposite the steering column from the point at which the stop spring 8 applies its force against the ring slider 1. The contact plates 14 and 15 are affixed with their respective legs 16 and 17 mounted to the socket plates 4 and 5 respectively. The legs 16 and 17 are connected to the socket plates 4 and 5 to provide a conductor path with the socket plates 4 and 5 or with other electrical connecting elements connected thereto.

Figure 4:
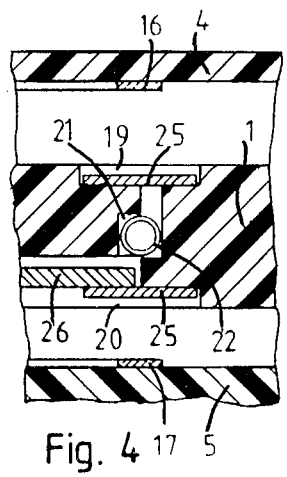
FIG. 4 is a cross-sectional view taken along sectional line IV—IV of FIG. 3 with portions removed.

In the ring slider 1 is a recess 18 that is aligned approximately radially to the axis of the passage 2 in the direction toward the stop profile 7. The recess 18 has two steps 19 and 20 formed on the top and bottom surfaces of the ring slider 1 (See FIG. 4). There are two oppositely offset or staggered slots which define the limits of a channel or groove 21 formed between the slots. The channel 21 receives a pre-stressed spring 22 in a direction perpendicular to the axis of the rotary pin 3.

A contact bridge 23 encompasses a center web 24 and two substantially rectangularly-bent legs 25 so that the contact bridge 23 forms a U-shaped design. The center web 24 is bent in the shape of a saddle surface. The contact bridge 23 would be convexly arched with respect to the axis of the passage 2 when viewed in an axial plane and would be concavely arched with respect to the axis of the passage 2 when viewed in a radial plane. This can be more clearly seen in FIGS. 3 and 5. In FIG. 3 the switch can be considered viewed in an axial plane cross-sectional view, and the contact bridge 23 has a convex arch with respect to the axis of the passage. The view in FIG. 5 can be considered a radial plane cross-sectional view and the contact bridge 23 is concavely arched with respect to the axis of the passage.

The arching ensures that the center web 24 adapts, on the one hand, to the circumference of the rotary pin 3, and, on the other hand, lies only with the middle range or section of the center web 24 coming in contact with the rotary pin 3. Attached to one leg 25 is a connecting conductor 26, soldered, welded, crimped or fastened in other conventional manners. The connecting conductor 26 is connected to other circuit means to control the desired functions.

FIG. 3 illustrates in solid lines the neutral position of the ring slider 1. The ring slider 1 tends to maintain this position by means of a leg spring 27 (FIG. 2) which tends to pull the ring slider down when it is pushed into the up position of FIG. 2, and tends to push the ring slider up when pulled in the opposite direction. The middle web 24 of the contact bridge 23 lies with its central area against the rotary pin 3 and has, consequently, contact only in the central area with the pin 3. The rotary pin 3 is manufactured of an insulating material, generally a plastic.

FIG. 3 also illustrates in broken lines the switching positions of the ring slider 1. By rocking or rotating the switching lever 12 in the clockwise direction, a lower area of the edge of the center web 24 comes into contact with the contact plate 15. This edge area, which is a marginal area, of the center web 24 is however, never adjacent with the rotary pin 3 due to the arching of the center web. Thus, no plastic abrasion or dirt can be present in the contact area 3. Also, the marginal edge area which comes into contact with the contact plate 15 rubs across the contact plate with a wiping action. This keeps the contact area clean and free from corrosion and oxides.

FIG. 3 also illustrates the switching position when the ring slider is pushed or rocked in the counter-clockwise direction. Here the upper edge or marginal area of the center web 24 comes into contact with the contact plate 14. Again the marginal area does not come into contact with the rotary pin 3 due to its arching.

Figure 5:
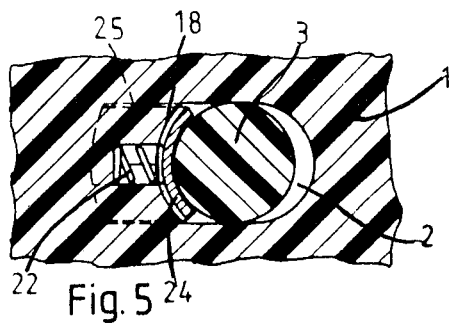
FIG. 5 is a cross-sectional view taken along sectional line V—V of FIG. 3 with portions removed.
Figure 6:
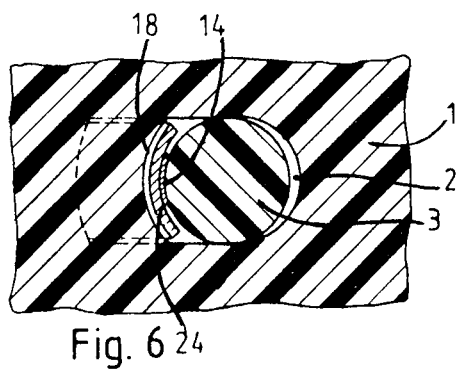
FIG. 6 is a cross-sectional view taken along sectional line VI—VI of FIG. 3 with portions removed.

FIG. 5 shows a section of the center web 24 which is adjacent to the rotary pin 3. It can be seen that a substantial amount of the center web 23 in this center portion contacts the rotary pin 3. In FIG. 6, which is illustrative of the contact switch making contact in the counter-clockwise direction of rotation, it can be seen that a smaller contact area comes into contact with the contact plate 14. The contact pressure applied by the pre-stressed spring 22, as well as by the stop spring 8 is sufficient to ensure sufficient contact pressure between the contact bridge 23 and the contact plates 14 and 15.

Thus, there has been provided a steering column switch that fully satisfies the objects, aims and advantages set forth above. It is evident that many alternatives, modifications, and variations will be apparent to those skilled in the art. Accordingly, it is intended to embrace all such variations as fall within the spirit and broad scope of the appended claims.

What is claimed is:

1. In a steering column switch to be mounted adjacent a steering spindle, a fixed rotary pin with a vertical axis parallel to the steering spindle and mounted between and in contact with two socket plates, a switching lever with an annular ring slider, the annular ring slider having opposite faces and having a passage which has its axis parallel to the pin vertical axis, the passage encompassing the fixed rotary pin and being rotatable about the rotary pin, the annular ring slider being mounted for pivoting such that the ring slider can tilt around a tilting axis that intersects the fixed rotary pin axis while the annular ring slider is rotatably shifted on the fixed rotary pin, the annular ring slider having a stopping profile diametrically opposite the passage for the fixed rotary pin and on the opposite side of the steering spindle, a stop spring engaging the stopping profile, the improvement comprising:

a recess area within the passage;

an electrical contact bridge within the recess area and abutting against the fixed rotary pin;

at least two electrical contact plates mounted on the fixed rotary pin, the respective ones of the contact plates being positioned to be slidably engaged by the electrical contact bridge as the ring slider is tilted around the tilting axis and while the ring slider is rotatably shifted on the fixed rotary pin; and means for forcibly urging the contact bridge in abutting relationship with the fixed rotary pin, whereby the contact bridge slidably engages and establishes electrical contact with the respective ones of the contact plates as the ring slider is tilted around the tilting axis.

2. The steering column switch of claim 1, wherein the contact bridge is convexly arched with respect to the axis of the passage when viewed in an axial plane and concavely arched with respect to the axis of the passage when viewed in a radial plane.

3. The steering column switch of claim 2, wherein the annular ring slider has a step on each of its opposite faces, the contact bridge being U-shaped with two legs, and having one leg retained within each of the steps.

4. The steering column switch of claim 3 wherein the means for forcibly urging the contact bridge in abutting relationship with the fixed rotary pin comprises a spring disposed within a channel formed in the annular ring slider and applying a force to the contact bridge to forcibly urge the contact bridge in abutting relationship with the fixed rotary pin.

5. The steering column switch of claim 4, further comprising an electrical conductor attached to one of the legs of the contact bridge.

* * * * *